(12) United States Patent
Hasegawa et al.

(10) Patent No.: US 6,601,383 B2
(45) Date of Patent: Aug. 5, 2003

(54) EMISSION CONTROL APPARATUS FOR ENGINE AND METHOD FOR REDUCING EMISSIONS OF ENGINE

(75) Inventors: Jun Hasegawa, Kariya (JP); Kouichi Shimizu, Handa (JP); Hisashi Iida, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/045,026

(22) Filed: Jan. 15, 2002

(65) Prior Publication Data

US 2002/0092292 A1 Jul. 18, 2002

(30) Foreign Application Priority Data

Jan. 16, 2001 (JP) ........................... 2001-007404
Oct. 29, 2001 (JP) ........................... 2001-330739

(51) Int. Cl.[7] ................................. F01N 3/00
(52) U.S. Cl. ................. 60/276; 60/274; 60/285; 60/297
(58) Field of Search ................. 60/274, 276, 277, 60/285, 295, 297, 284

(56) References Cited

U.S. PATENT DOCUMENTS

| 5,373,696 | A | | 12/1994 | Adamczyk, Jr. et al. |
|---|---|---|---|---|
| 5,613,359 | A | | 3/1997 | Zahn et al. |
| 6,092,368 | A | * | 7/2000 | Ishii et al. ............ 60/277 |
| 6,145,304 | A | * | 11/2000 | Takahashi et al. ........ 60/277 |
| 6,158,212 | A | * | 12/2000 | Tanaka ................ 60/277 |
| 6,167,696 | B1 | | 1/2001 | Maaseidvaag et al. |
| 6,185,933 | B1 | | 2/2001 | Tsuzuki et al. |
| 6,370,872 | B1 | * | 4/2002 | Watanabe et al. ......... 60/288 |

FOREIGN PATENT DOCUMENTS

JP   11-210446   8/1999

\* cited by examiner

*Primary Examiner*—Thomas Denion
*Assistant Examiner*—Binh Tran
(74) *Attorney, Agent, or Firm*—Nixon & Vanderhye P.C.

(57) ABSTRACT

An emission control apparatus for an engine has a plurality of catalysts disposed in series in an exhaust passage. An HC absorbent catalyst is utilized for at least one of the catalysts. An ECU controls an A/F ratio in an upstream side of the HC absorbent catalyst at a target value. The target value is corrected to a leaner value when the HC absorbent catalyst is in a desorbing condition. The leaner value is leaner than the target value during the HC absorbent catalyst is in an absorbing condition or an activated condition. The leaner atmosphere provides sufficient of oxygen to purify desorbed HC from the HC absorbent catalyst itself.

22 Claims, 16 Drawing Sheets

EMISSION CONTROL APPARATUS FOR ENGINE AND METHOD FOR REDUCING EMISSIONS OF ENGINE

CROSS REFERENCE TO RELATED APPLICATION

This application is based on Japanese Patent Application No. 2001-7404 filed on Jan. 16, 2001 and No. 2001-330739 filed on Oct. 29, 2001 the contents of which are incorporated herein by reference.

BACKGROUND OF THE INVENTION

1. Field of the Invention

The present invention relates to an emission control apparatus for an engine and a method for reducing emissions of an engine.

2. Description of Related Art

JP-A-2000-2138 discloses an apparatus for reducing emissions of an engine that has series disposed two HC absorbent catalysts. The HC absorbent catalyst (HC catalyst) carries a hydrocarbon (HC) absorbent (e.g. zeolite) for absorbing HC when the HC catalyst is at a relatively low temperature (absorbing condition) such as just after the engine start and for desorbing the absorbed HC when the HC catalyst is heated to a predetermined temperature range (desorbing condition). The HC catalyst may carry three-way catalyst components for reducing emissions when the HC catalyst is heated to an activated temperature range (activated condition).

JP-A-2000-2138 also discloses a feedback controller for maintaining air-fuel ratio (A/F) of an exhaust gas in the HC catalyst at a stoichiometric value when the catalyst reaches the activated condition. This air-fuel ratio control may reduce emissions when both the catalysts are in the activated condition. However, the HC catalyst disposed downstream may not oxidize desorbed HG since both the HC catalysts may not be activated simultaneously. For example, the air-fuel ratio in the HC catalyst disposed downstream may exceed too rich, since the HC catalyst disposed downstream still in the desorbing condition when the HC catalyst disposed upstream reaches the activated condition.

SUMMARY OF THE INVENTION

The present invention addresses these drawbacks by providing an emission control apparatus for an engine and a method for reducing emissions of an engine that are capable of reducing an amount of HC emissions.

According to the present invention, a HC absorbent catalyst desorbs absorbed HC when the HC absorbent catalyst is in a desorbing condition. An air-fuel ratio of exhaust gas in the HC absorbent catalyst is controlled by at least one of feedback loops. At least one of target values associated with a HC absorbent catalyst by one of feedback loops is varied to a leaner value when the HC absorbent catalyst is in a desorbing condition. The leaner target value provides a leaner atmosphere in the HC catalyst, and provides sufficient oxygen to oxidize HC desorbed from the HC absorbent catalyst itself.

For example, in the case that a first catalyst disposed upstream is the HC absorbent catalyst, a first target value for an upstream of the first catalyst may be corrected to the leaner value, since the first target value is associated with the HC absorbent catalyst by a main feedback loop. In the case that a second catalyst disposed downstream is the HC absorbent catalyst, a second target value for an upstream of the second catalyst may be varied to the leaner value, since the second target value is associated with the HC absorbent catalyst by a first sub-feedback loop. Further, in the case that both of the first and second catalysts are the HC absorbent catalysts, at least one of the target value or both of the first and second target values may be varied to the leaner values.

In the present invention, whether the HC absorbent catalyst is in the desorbing condition or not may be determined by detecting a temperature of the HC absorbent catalyst. For example, the desorbing condition may be detected when the temperature reaches the predetermined temperature range. The temperature may be detected or presumed from the HC absorbent catalyst, the exhaust gas, elapsed time from starting the engine or the like. In the case of using the elapsed time, the target value may be varied when the elapsed time reaches a fixed threshold value. Additionally, the threshold value may be compensated based on a factor that affects a period of time to heat the HC absorbent catalyst to the predetermined temperature range from the engine start. For example, a temperature of a coolant of the engine, a temperature of the surroundings, an accumulated amount of fuel consumption from the engine start or the like may be used.

The target value may be put back to a normal value when the temperature of the HC absorbent catalyst is heated from the predetermined temperature range to an activated temperature range or when an output of the sensor disposed downstream of the HC absorbent catalyst is changed from rich to lean.

The present invention may be adaptive with a control of downstream side air-fuel ratio. For example, in the case that the first catalyst is the HC absorbent catalyst, the downstream side air-fuel ratio may be maintained at a leaner value to ensure that the air-fuel ratio in the HC absorbent catalyst is lean. In the case that the second catalyst is the HC absorbent catalyst, the downstream side air-fuel ratio may be maintained at a leaner value to ensure that the air-fuel ratio in the HC absorbent catalyst is lean.

The leaner value of the target value may be determined to maintain emissions of nitrogen oxides. In the case that the second catalyst disposed downstream is the HC absorbent catalyst, by correcting the second target value to the leaner value, it is possible to maintain emissions of nitrogen oxides.

Additionally, a deterioration of the HC absorbent catalyst may be detected based on an output of a sensor disposed on a downstream side of the HC absorbent catalyst when the target value is the leaner value. The output of the sensor disposed on a downstream side of the HC absorbent catalyst may be turned into a lean value earlier than a normal condition when the HC absorbent catalyst is deteriorated, since a desorbed amount of HC from the HC absorbent catalyst is decreased when the HC absorbent catalyst is deteriorated. Therefore, it is possible to detect the deterioration of the HC absorbent catalyst by monitoring the output of the sensor. Both of the outputs from the sensors disposed on upstream and downstream sides of the HC absorbent catalyst may be monitored to detect the deterioration more accurately.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS

Embodiments will be explained with reference to figures. In the embodiments, the present invention is applied to an emission control apparatus for an engine mounted on a passenger vehicle.

(First Embodiment)

Figure 1:
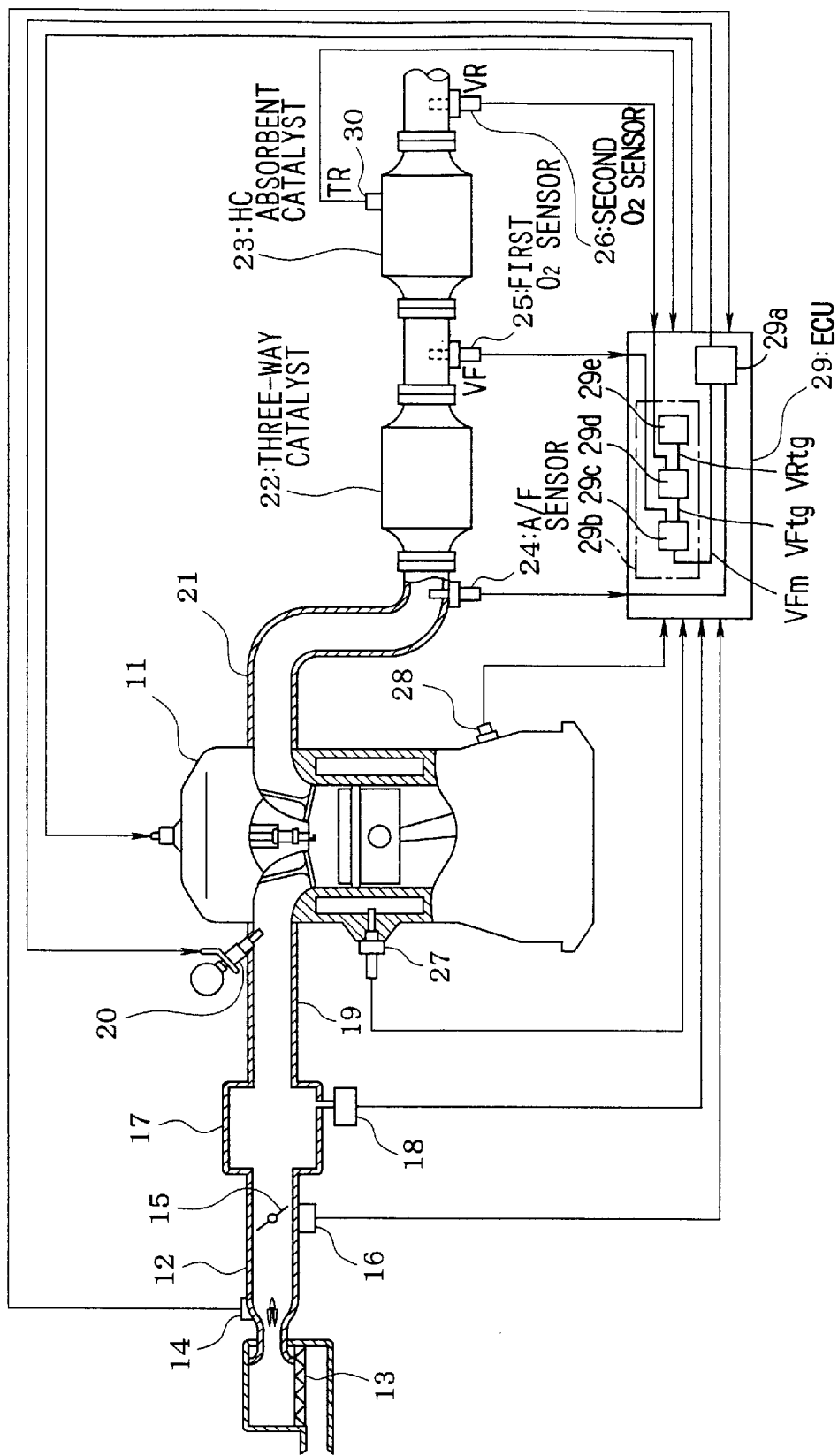
FIG. 1 is a schematic view of an engine control system including an emission control apparatus for an engine according to a first embodiment of the present invention.

Referring to FIG. 1, a vehicle has an internal combustion engine 11 with an intake and an exhaust system, and an emission control apparatus.

The engine 11 has an intake passage 12. An air cleaner 13 is disposed on an upstream end of the intake passage 12. An air flow meter 14 is disposed on a downstream of the air cleaner 13. A throttle valve 15 with a throttle sensor 16 for detecting an opening degree of the throttle valve 15 is disposed on a downstream of the air flow meter 14. A surge tank 17 with a pressure sensor 18 for detecting an intake air pressure is disposed on a downstream of the throttle valve 15. The surge tank 17 is connected to intake manifolds 19. Each of the intake manifolds 19 has a fuel injector 20 disposed close to an intake port of each of cylinders for supplying fuel to the engine 11.

The engine 11 has an exhaust passage 21. Two catalysts, first and second catalysts 22 and 23, are disposed in series on the exhaust passage 21. The first catalyst 22 disposed upstream side is a three-way catalyst 22 for reducing CO, HC and NOx in an exhaust gas. The second catalyst 23 disposed downstream side is a HC trapper. In this embodiment, a HC absorbent catalyst (HC catalyst) 23 is utilized as the HC trapper. The HC catalyst 23 has a substrate that carries HC absorbent such as a zeolite and three-way catalyst components such as precious metals.

The HC catalyst 23 absorbs HC when a temperature of the HC catalyst 23 is relatively low such as a just after the engine start. The HC catalyst 23 desorbs absorbed HC when the temperature of the HC catalyst 23 reaches from a predetermined absorbing temperature range to a predetermined desorbing temperature range. The HC catalyst 23 starts to release the absorbed HC when the temperature is within or above the predetermined desorbing temperature range. The first catalyst 22 and the HC catalyst 23 are activated for purifying the exhaust gas by catalysis reactions caused by the three-way catalyst components when the temperature of the catalyst reaches a predetermined activated temperature range. Therefore, condition of the HC catalyst 23 changes to a absorbing condition, a desorbing condition and an activated condition as the temperature of the HC catalyst 23 rises.

A first sensor 24 is disposed on an upstream side of the first catalyst 22. The first sensor 24 is a liner type air-fuel ratio sensor (A/F sensor) that detects an air-fuel ratio (A/F) of the exhaust gas and outputs signal indicating a detected A/F. A second sensor 25 is disposed on a downstream side of the first catalyst 22 and an upstream side of the second catalyst 23. A third sensor 26 is disposed on a downstream side of the second catalyst 23. The second and third sensors 25 and 26 are oxygen sensors ($O_2$ sensors) that output voltages in response to rich or lean of the exhaust gas. The $O_2$ sensor may be utilized for the first sensor 24. The A/F sensor may be utilized for the second sensor 25 and/or third sensor 26.

A temperature sensor 30 is disposed on a middle portion of the second catalyst 23 for detecting a temperature of the second catalyst 23. The temperature sensor 30 may be disposed on the other portion of the second catalyst 23 such as an upstream portion, downstream portion or the like. Further, a plurality of temperature sensors maybe disposed on the second catalyst to detect and calculate an average temperature. A temperature sensor 27 is disposed on a cylinder block of the engine 11 for detecting a temperature of a coolant. A crank angle sensor 28 is disposed on the engine 11 for detecting a rotating speed and an angle of the engine 11.

An engine control unit (ECU) 29 is disposed on the vehicle and is connected with the several sensors and actuators to control the engine 11. The ECU 29 includes microcomputer and works as functional means by executing programs memorized in ROMs. The ECU 29 executes a main feedback control (main F/B control) for a main F/B loop, a first sub-F/B control for a sub-F/B loop and a second sub-F/B control for a sub-F/B loop.

In the mail F/B control, the ECU 29 calculates a coefficient for correcting an air-fuel ratio feedback control of an amount of a fuel injection based on the output of the first sensor 24 so that the A/F of the upstream side of the first catalyst 22 is maintained at a main target value (first target value) VFm. The ECU 29 determines a fuel amount to be injected from the fuel injector 20 based on characteristics with parameters such as the coefficient calculated and coefficients corresponding to the temperature of the coolant, accelerations, decelerations, history of operations learned during operations, and so on. As a result, the ECU 29 and the first sensor 24 provide the main F/B loop for varying a fuel amount supplied to the engine to maintain the A/F detected by the first sensor 24 at a first target value. A general configuration of the main F/B loop is shown in FIG. 1 with a F/B controller 29a and a setting device 29b. The setting device 29b provides the first target value VFm.

In the first sub-F/B control, the ECU 29 detects an A/F of an upstream side of the second catalyst 23 indicated by the output VF of the second sensor 25, and corrects the main F/B target value so that the A/F detected by the second sensor 25 is maintained at a second target value VFtg. As a result, the ECU 29 and the second sensor 25 provide the first sub-F/B loop for varying a first target value to maintain the A/F detected by the second sensor 25 at the second target value. A general configuration of the first sub-F/B loop is shown in FIG. 1 with a F/B controller 29c.

In the second sub-F/B control, the ECU 29 detects an A/F of a downstream side of the second catalyst 23 indicated by the output VR of the third sensor 26, and corrects the second target value VFtg so that the A/F detected by the third sensor 26 is maintained at a third target value VRtg which is determined to increase a purifying efficiency of the second catalyst. As a result, the ECU 29 and the third sensor 26 provide the second sub-F/B loop for varying the second target value VFtg to maintain the A/F detected by the third sensor 26 at the third target value VRtg. A general configuration of the second sub-F/B loop is shown in FIG. 1 with a F/B controller 29d and a third target value setting device 29e.

Further, the ECU 29 executes a HC purifying control and a diagnosis for the second catalyst 23. The ECU 29 determines conditions of the second catalyst 23 based on the detected temperature of the temperature sensor 30. If the second catalyst 23 reaches to the desorbing condition, the ECU 29 shifts the second target value VFtg to a leaner value for increasing reactions for oxidizing HC released from the second catalyst 23. The desorbing condition may be detected by detecting that the temperature of the second catalyst 23 reaches the predetermined desorbing temperature range. The leaner target value provides a still more appropriate atmosphere for the catalytic components for purifying HC. The ECU 29 diagnoses the second catalyst 23 based on the output signals from the second and third sensors 25 and 26 during the HC purifying control. Then, the ECU 29 puts the second target value back from the leaner value to the normal value.

Figure 2:
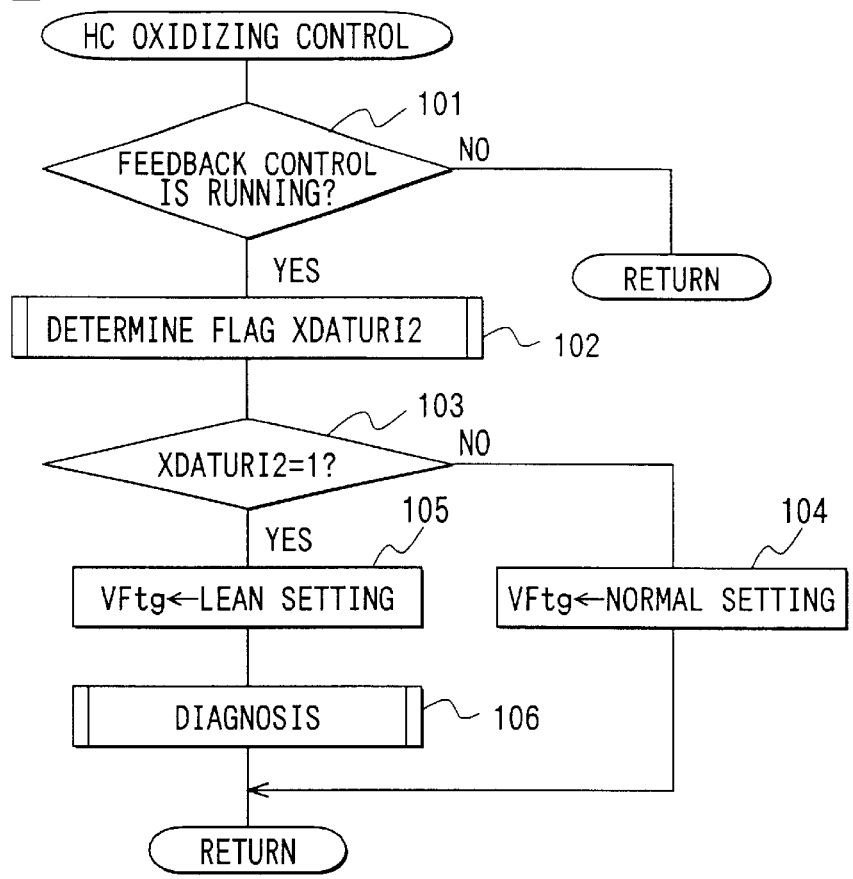
FIG. 2 is a flowchart showing an operation of the apparatus according to the first embodiment of the present invention.
Figure 3:
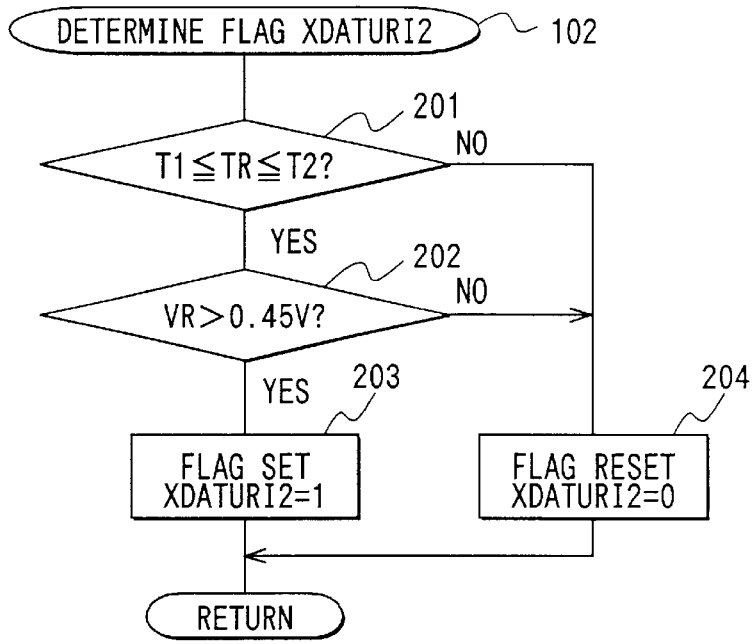
FIG. 3 is a flowchart showing an operation of the apparatus according to the first embodiment of the present invention.

Referring to FIGS. 2–3, this program runs predetermined time or crank angle intervals, and acts as the HC oxidizing control for purifying the desorbed HC. In a step 101, it is determined that the main F/B control and/or sub-F/B controls is running or not. If no F/B control is running, the program does not proceed. If any one of F/B controls is running, the routine proceeds to the next step.

In a step 102, it is determined that the second catalyst 23 is in the desorbing condition or not by determining that the temperature of the second catalyst 23 is in the temperature range where the second catalyst 23 disconnects HC. FIG. 3 shows details of the step 102. In a step 201, it is determined that the detected temperature TR of the second catalyst 23 is in between T1 and T2. The lower limit T1, for example 100° C., is set close to a temperature where the second catalyst 23 begins to release HC. The upper limit T2, for example 200° C., is set close to a temperature where the second catalyst 23 is activated as the three-way catalyst.

The conditions of the HC catalyst 23 and the temperature of the HC catalyst 23 may be presumed based on an elapsed time from the engine start. For example, the ECU 29 counts an elapsed time from the engine start, and compares the counts with a threshold time t1 and t2. Then, the ECU 29 determines that the HC catalyst 23 is in the absorbing condition when the count is shorter than the threshold time t1, the HC catalyst 23 is in the desorbing condition when the count is in between the threshold times t1 and t2, and the HC catalyst 23 is in the activated condition when the count is longer than the threshold time t2. For example, the threshold time ti may be forty seconds, and the threshold time t2 may be 70 seconds. Additionally, the threshold times t1 and t2 may be fixed values, but also these times may be corrected based on at least one of a temperature of an engine coolant, a temperature of outside air (surroundings of the engine), and an accumulated amount of consumed fuel from the engine start.

If the temperature of the HC catalyst 23 is out of the predetermined range in the step 201, the program proceeds to a step 204, the ECU 29 resets a flag XDATURI2, for instance the flag is set "0" which means it is not the desorbing condition.

On the other hand, if the temperature of the HC catalyst 23 is in the predetermined range, the program proceeds to a step 202. In the step 202, the ECU 29 inspects a voltage of the output VR of the third sensor 26, and determines that whether the output indicates the A/F is larger than the stoichiometric (e.g. 0.45 (v)) or not. That is, the ECU 29 determines that the HC catalyst 23 is releasing the absorbed HC by detecting rich A/F on the downstream of the HC catalyst 23. If the output VR indicates lean A/F, the program proceeds to the step 204 to reset the flag XDATURI2. If the output VR indicates rich A/F, the program proceeds to a step 203, and sets the flag XDATURI2.

Figure 4:
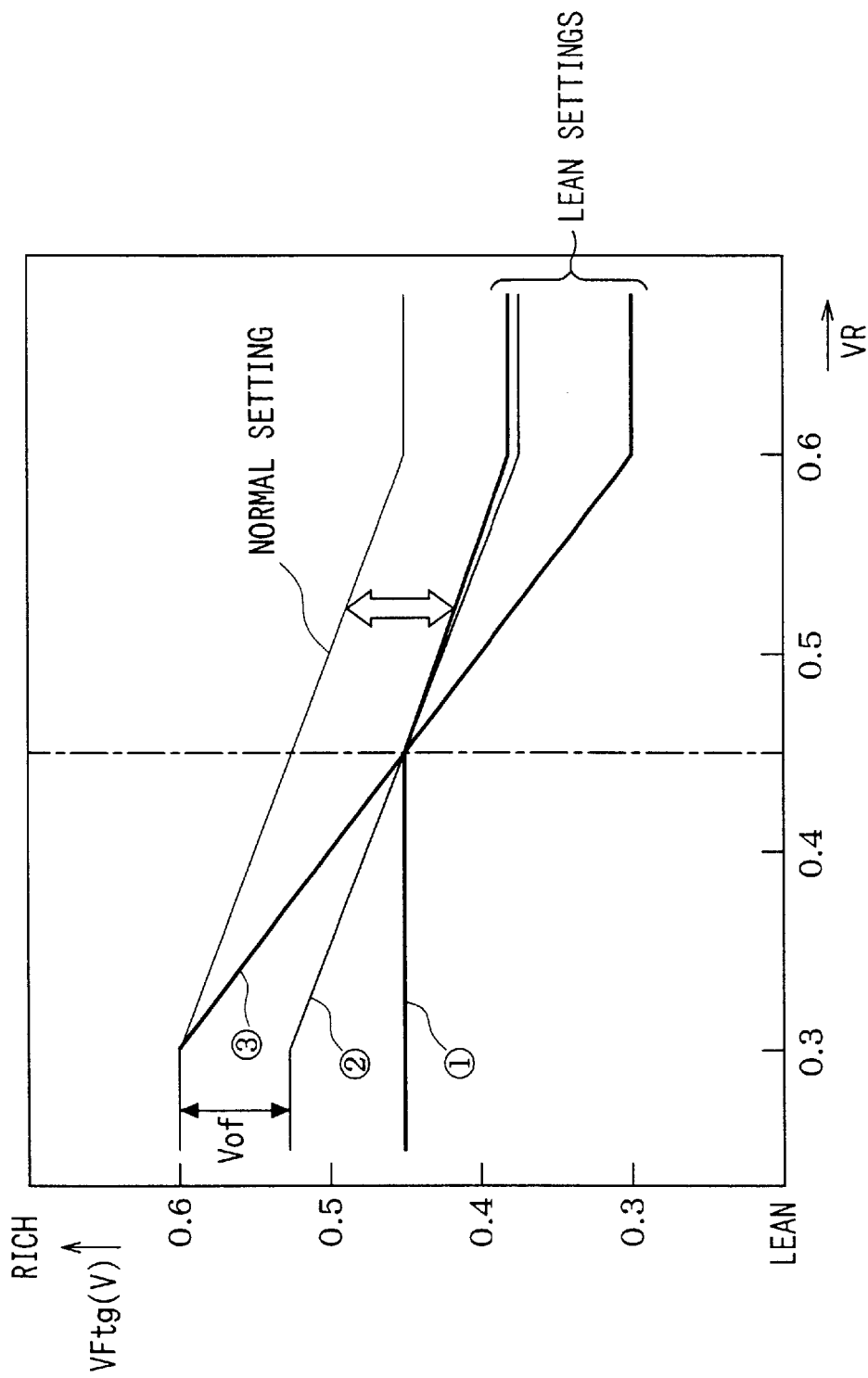
FIG. 4 is a graph showing target values according to the first embodiment of the present invention.

The flag XDATURI2 is inspected in step 103. If the flag indicates "0", a target value VFtg of the upstream side of the HC catalyst 23 is set by a normal setting characteristic. The normal setting characteristic provides the target value based on the output voltage VR of the third sensor 26 as shown in FIG. 4. The normal setting characteristic provides leaner target values as the output voltage VR increases. However, in the normal setting characteristic, the target value VFtg limited richer values than the stoichiometric A/F (0.45(v)).

On the other hand, if the flag indicates "1", the program proceeds to a step 105. In the step 105, a leaner value is set as the target value VFtg based on one of the lean setting characteristics as shown in FIG. 4. The lean setting characteristic provides the target value based on the output voltage VR of the third sensor 26 as shown in FIG. 4. The lean setting characteristics provide leaner target values as the output voltage VR increases. The leaner setting characteristics provide leaner values than that of the normal setting characteristic. Then, the second sub-F/B loop maintains the A/F in the upstream side of the HC catalyst 23 at the leaner target values provided by the lean setting characteristic. The lean atmosphere supplies more oxygen than the rich atmosphere to the HC catalyst 23 to purifying the desorbed HC. The HC catalyst 23 purifies the desorbed HC even if it is not activated as the three-way catalyst.

FIG. 4 shows three variations of the lean setting characteristics. The characteristics may be selected based on system configurations. All of the characteristics provides leaner target values than the stoichiometric value when the third sensor 26 indicates rich A/F, and provides the target values as same as or around the stoichiometric value when the third sensor 26 indicates the stoichiometric value. The first characteristic shown in FIG. 4 provides the fixed target value which is the same as the stoichiometric value or similar when the third sensor 26 indicates leaner A/F than the stoichiometric value. The second characteristic provides the leaner values just leaner by V of from the normal setting characteristic. The third characteristic has the same limit on the rich side as the normal setting characteristic. The leaner values provided by the leaner setting characteristics are determined to maintain emissions of nitrogen oxides (NOx.)

In a step 106, a diagnosis program is executed to detect a deterioration of the HC catalyst 23. It is determined whether it is possible to diagnose a HC desorbing function or not based on the output of the second sensor 25. If the output VF is equal to or higher than the stoichiometric value, the remaining processes are jumped.

If the output VF is lower than the stoichiometric value, a difference $\Delta V(i)$ between the outputs VR and VF is calculated ($\Delta V(i)=VR-VF$) in a step 212. The difference $\Delta V(i)$ is a parameter which indicates an amount of the desorbed HC from the HC catalyst 23. The difference $\Delta V(i)$ is increased as the amount of the desorbed HC increases. An accumulated amount $\Sigma\Delta V(i)$ is calculated ($\Sigma\Delta V(i)=\Sigma\Delta V(i-1)+\Delta V(i)$) in a step 213 as a parameter for detecting the deterioration.

In a step 214, it is detected that the flag XDATURI2 is changed from "1" to "0". The change of the flag indicates the end of the desorbing condition of the HC absorbing catalyst 23 as well as the end of the lean setting control of the step 105. For instance, the change of the flag indicates that the HC catalyst 23 reaches from the desorbing condition to the activated condition, or the output of the second sensor 26 changes from rich to lean value.

When the flag indicates "1", the amount $\Delta V(i)$ is accumulated. Therefore, the accumulated amount $\Sigma\Delta V(i)$ may indicates total amount of the desorbed HC. When the program proceeds to a step 215, the accumulated amount $\Sigma\Delta V(i)$ is compared with a threshold K1. If the accumulated amount $\Sigma\Delta V(i)$ is higher than the threshold K1, the HC catalyst 23 is presumed as a normal, a flag XHCDAIAG2 is reset to "0" in step 216. On the other hand, if the accumulated amount $\Sigma\Delta V(i)$ is not higher than the threshold K1, at least one of HC absorbing capacity or desorbing capacity is presumed as a deteriorated, and a flag XHCDAIAG2 is set to "1", in a step 217. Additionally, an indicator (not shown) is activated to warn a vehicle operator of the deterioration of the HC catalyst 23, and keep related information in a back-up RAM in the EGU 29.

Figure 6:
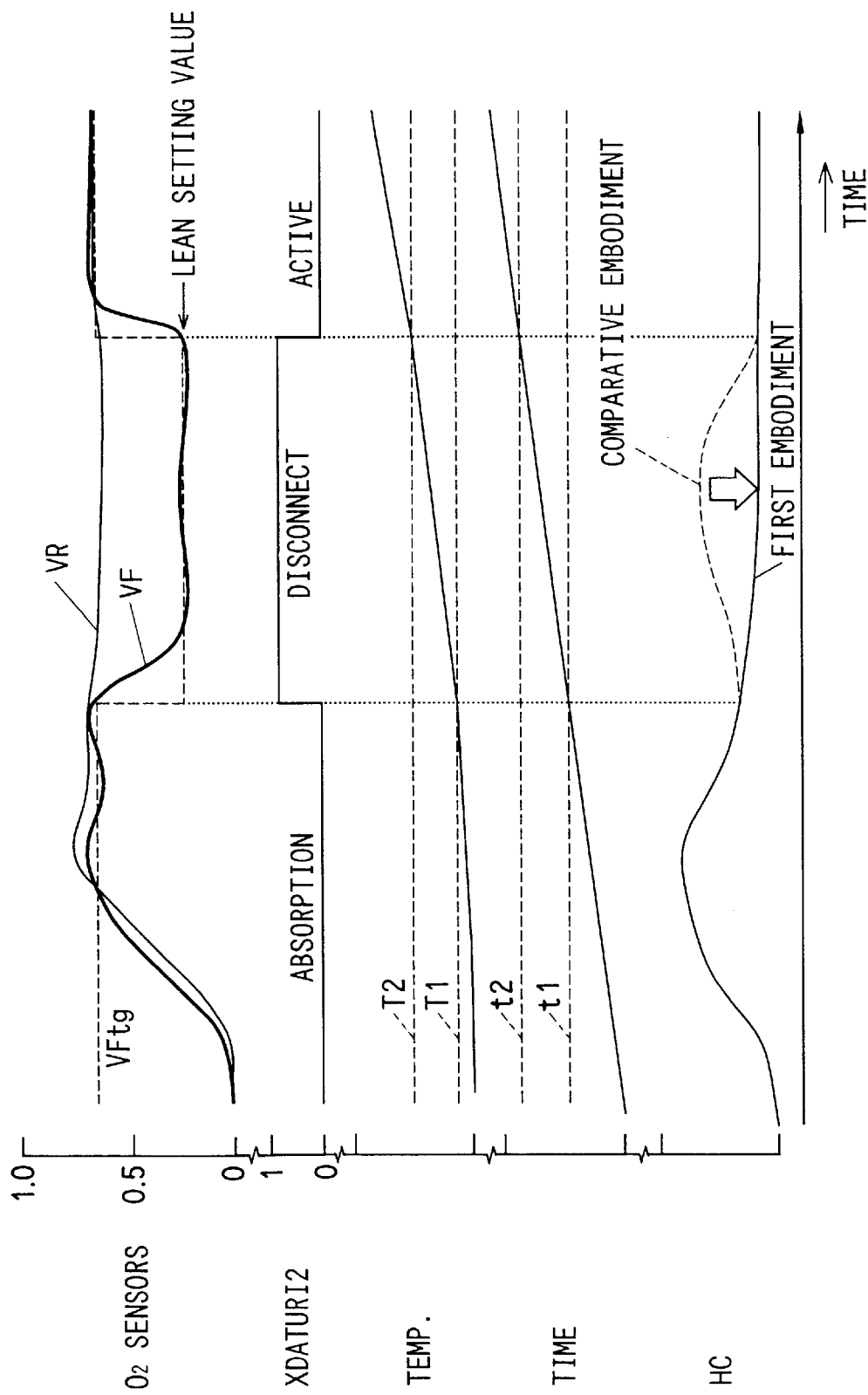
FIG. 6 is a diagram showing an example of a control from a cold start according to the first embodiment of the present invention.
Figure 7:
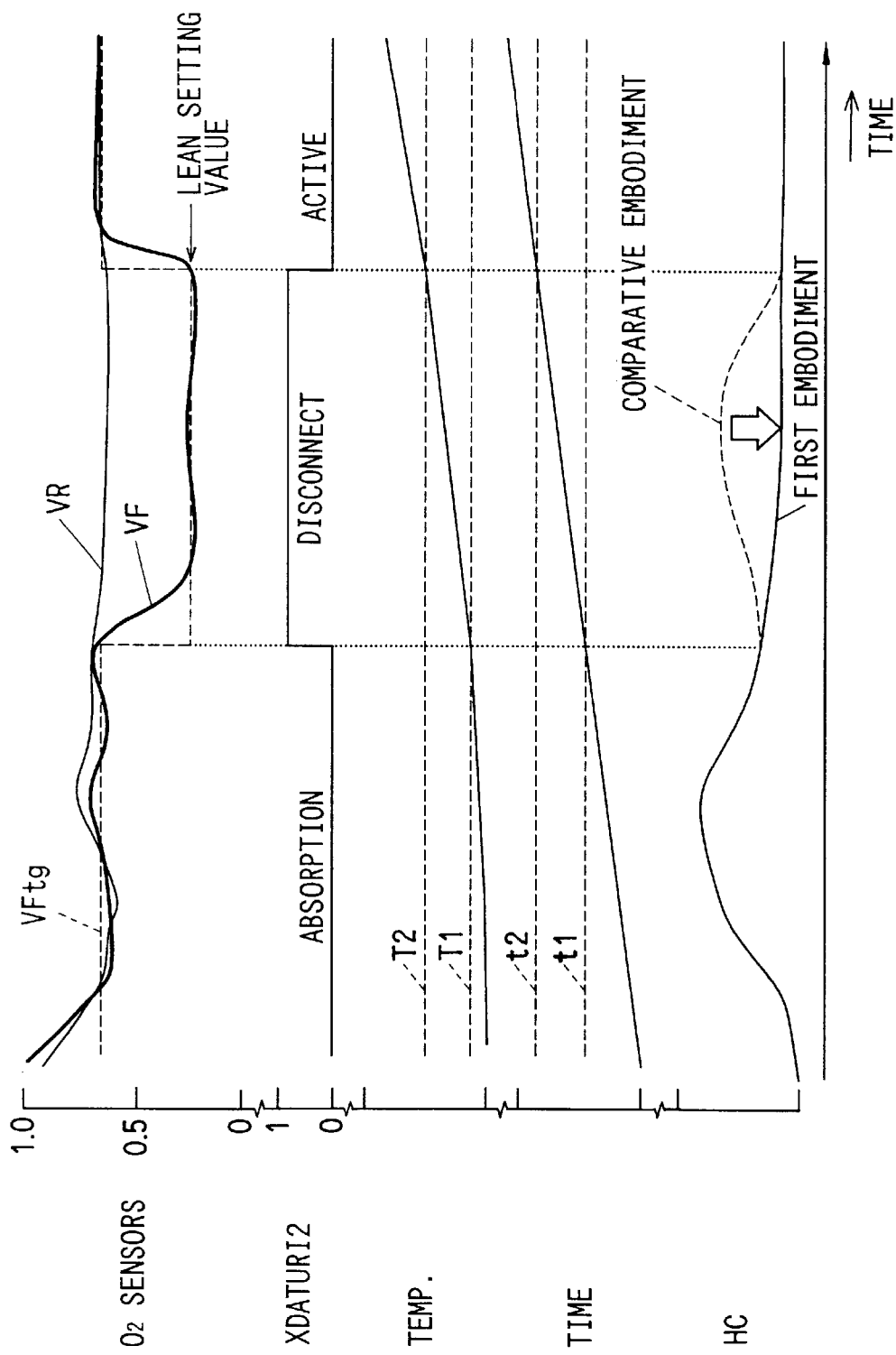
FIG. 7 is a diagram showing an example of a control from a hot-re-start according to the first embodiment of the present invention.
Figure 8:
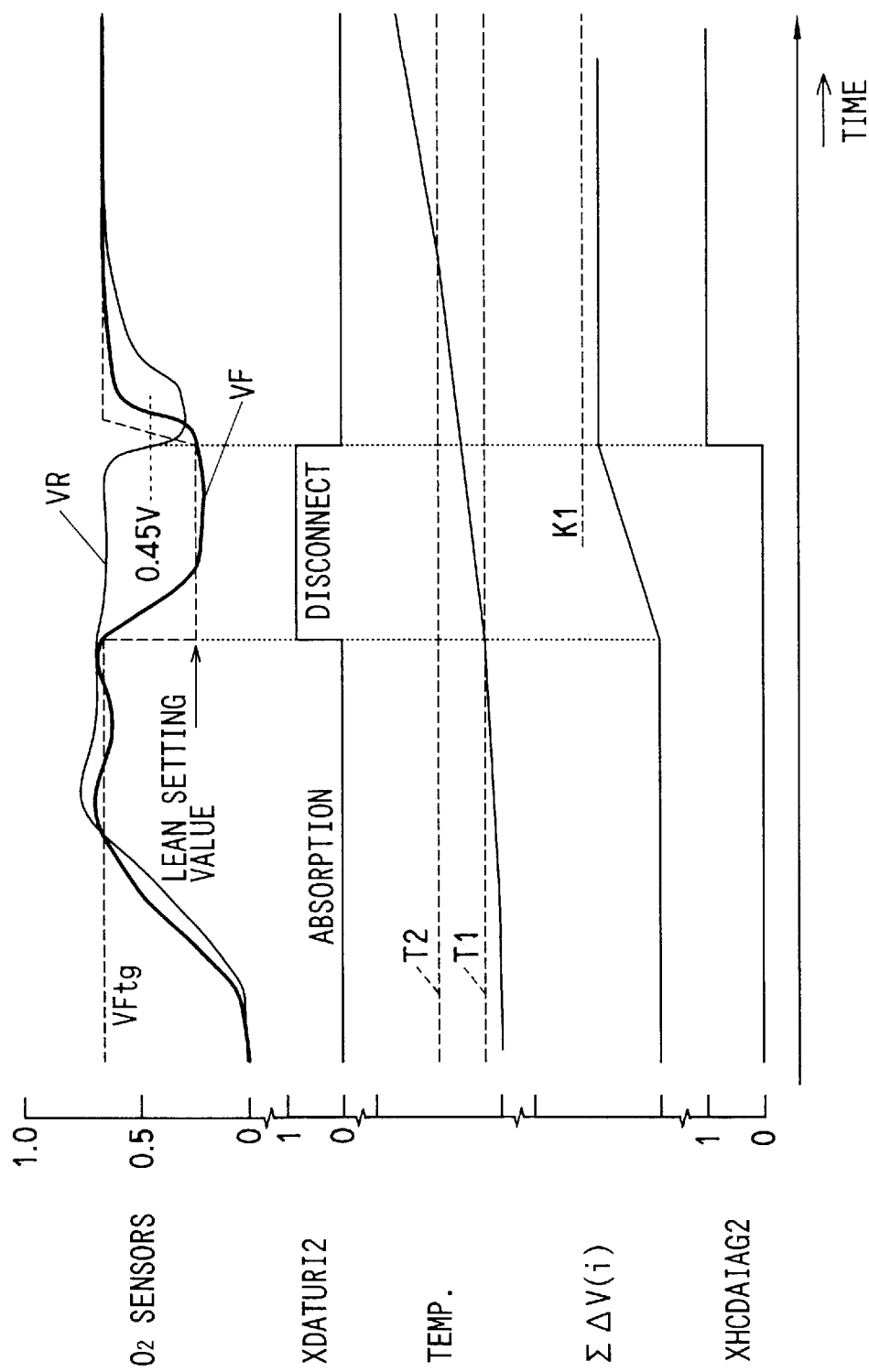
FIG. 8 is a diagram showing an example of a control when the HC catalyst is deteriorated according to the first embodiment of the present invention.

Examples of the control performed by the above-described embodiment will be explained with reference to FIGS. 6, 7 and 8. FIG. 6 shows an example in which the engine is started from a cold condition when both of the second and third sensors 25 and 26 are not activated, and the HC catalyst 23 properly works. FIG. 7 shows an example in which the engine is started from a hot condition when both of the second and third sensors 25 and 26 are activated, and the HC catalyst 23 properly works. FIG. 8 shows an example in which the HC catalyst 23 is deteriorated.

Referring to FIG. 6, a normal target value is provided by the step 104 after the engine start. The output VF increases to follow the target value VFtg with delay, and is maintained at the target value VFtg by the first sub-F/B loop provided by the ECU 29 during an absorption period (the absorbing condition) of the HC catalyst 23. The output VR also increases to follow the target value VFtg, and is maintained at the target value VFtg by the second sub-F/B loop provided by the ECU 29. During the absorption period, the emissions of HC are decreased by being absorbed into the HC catalyst 23. Further, the output of the first sensor 24 is also maintained at the first target value by the main F/B loop provided by the ECU 29.

Then, the temperature of the HC catalyst 23 rises to T1, the HC catalyst 23 turns into the desorbing condition, the target value VFtg is changed to the leaner value provided by the step 105. During the disconnect period (desorbing condition), the output VF follows the target value VFtg, but the output VR remains higher (rich) value since the target value VRtg remains and the HC catalyst 23 desorbs the absorbed HC. However, oxygen concentration in the exhaust gas flowing into the HC catalyst 23 is increased since the output VF is maintained at the leaner value. As a result, the HC catalyst may oxidize more desorbed HC than that of the target value VFtg is maintained richer values. The emissions of HC are reduced relative to a comparative embodiment as shown in the bottom section of FIG. 6. The comparative embodiment shows the emissions of HC when the target value VFtg is maintained at the normal setting values during the disconnect period. The difference between the outputs VF and VR is accumulated during the disconnect period.

When, the temperature of the HC catalyst 23 reaches to T2, the HC catalyst is activated as the three-way catalyst, the target value VFtg is put back to the normal setting values. Therefore, the output VF increases to follow the target value VFtg. Meanwhile, the accumulated amount $\Sigma\Delta V(i)$ is compared with the threshold K1 to detect the deterioration.

If the HC catalyst 23 is deteriorated, an amount of oxygen that reacts with the desorbed HC in the HC catalyst 23 is decreased, since an amount of the desorbed HC decreases. In the case of the deterioration, the output VR changes to a leaner value earlier as shown in FIG. 8. As a result, the accumulated amount $\Sigma\Delta V(i)$ doesn't reach the threshold K1. Therefore, if the HC catalyst 23 is deteriorated, the flag XHCDAIAG2 is set to indicate the deterioration when the output VR indicates the lean A/F.

Although the outputs VF and VR start from rich voltages when the engine is started just after an engine stop while both of the second and third sensors 25 and 26 are activated, the above-described embodiment works to reduce the emissions of HC. Referring to FIG. 7, if the temperature of the HC catalyst 23 is cooled before the engine start, the embodiment sets the leaner target value to reduce the emissions of HC.

(Second Embodiment)

Figure 5:
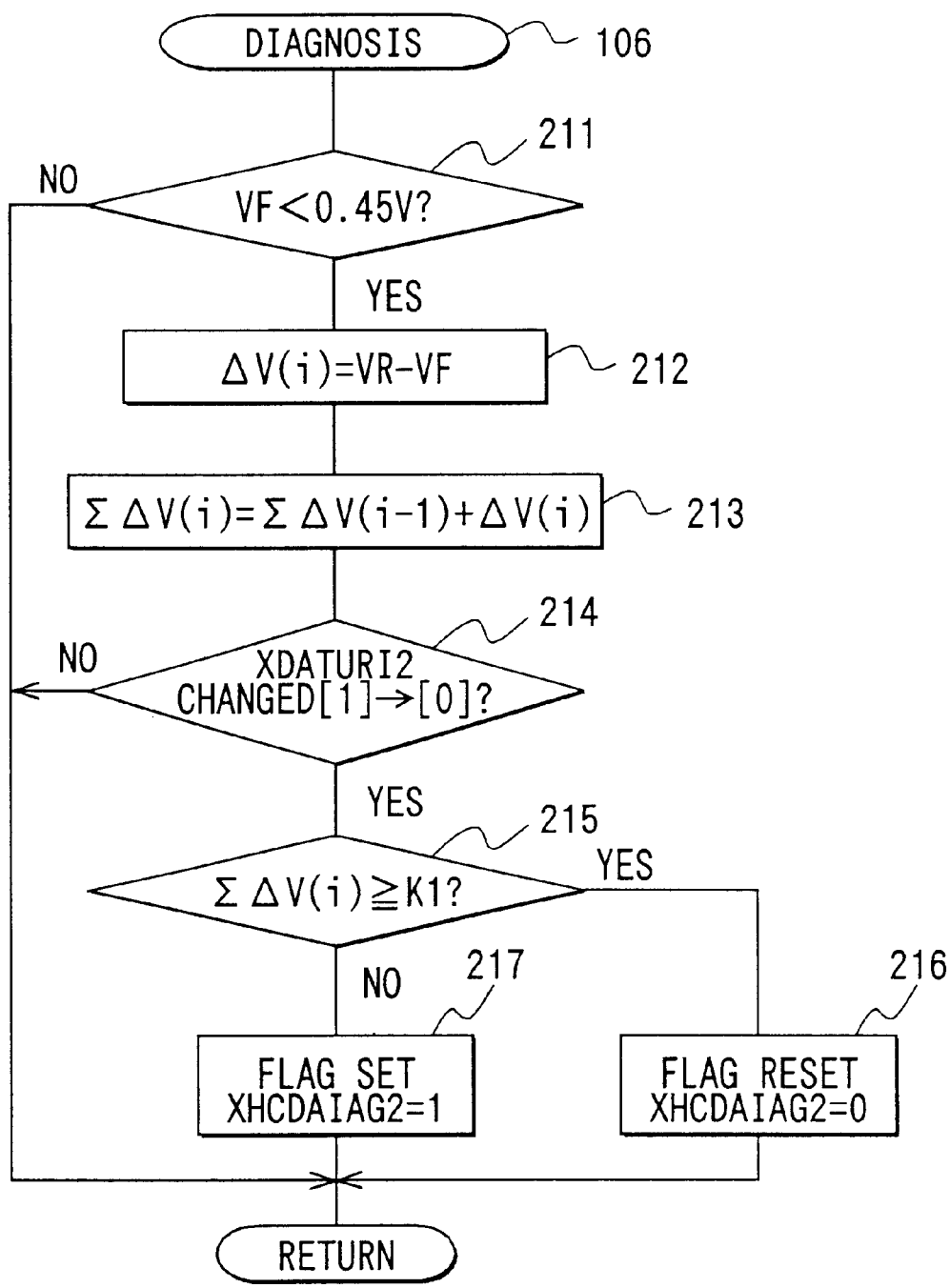
FIG. 5 is a flowchart showing an operation of the apparatus according to the first embodiment of the present invention.
Figure 9:
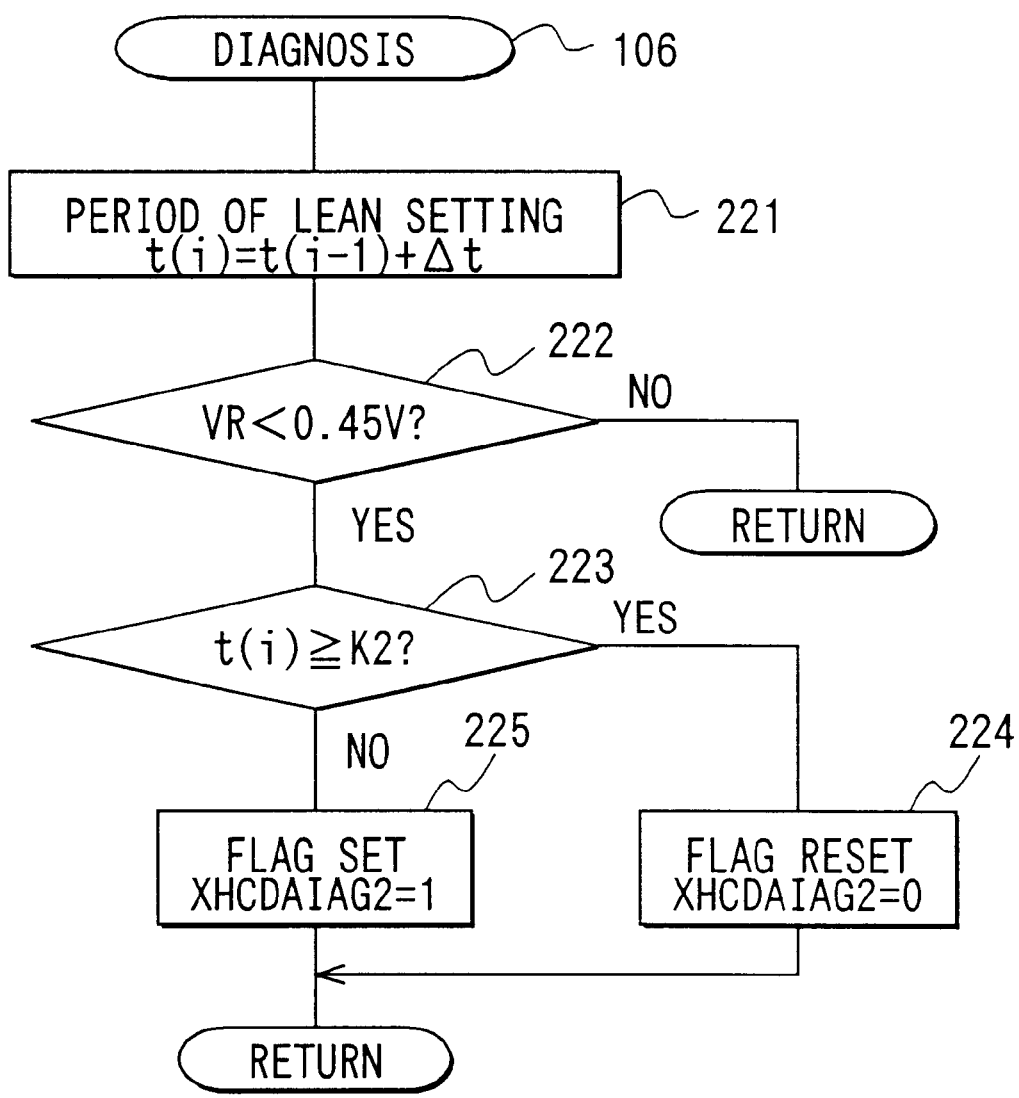
FIG. 9 is a flowchart showing an operation of the apparatus according to a second embodiment of the present invention.

FIG. 9 is an alternative diagnosis program instead of the program shown in FIG. 5. The second embodiment utilizes an elapsed time of the desorbing condition as a parameter for detecting the deterioration of the HC catalyst 23.

Figure 10:
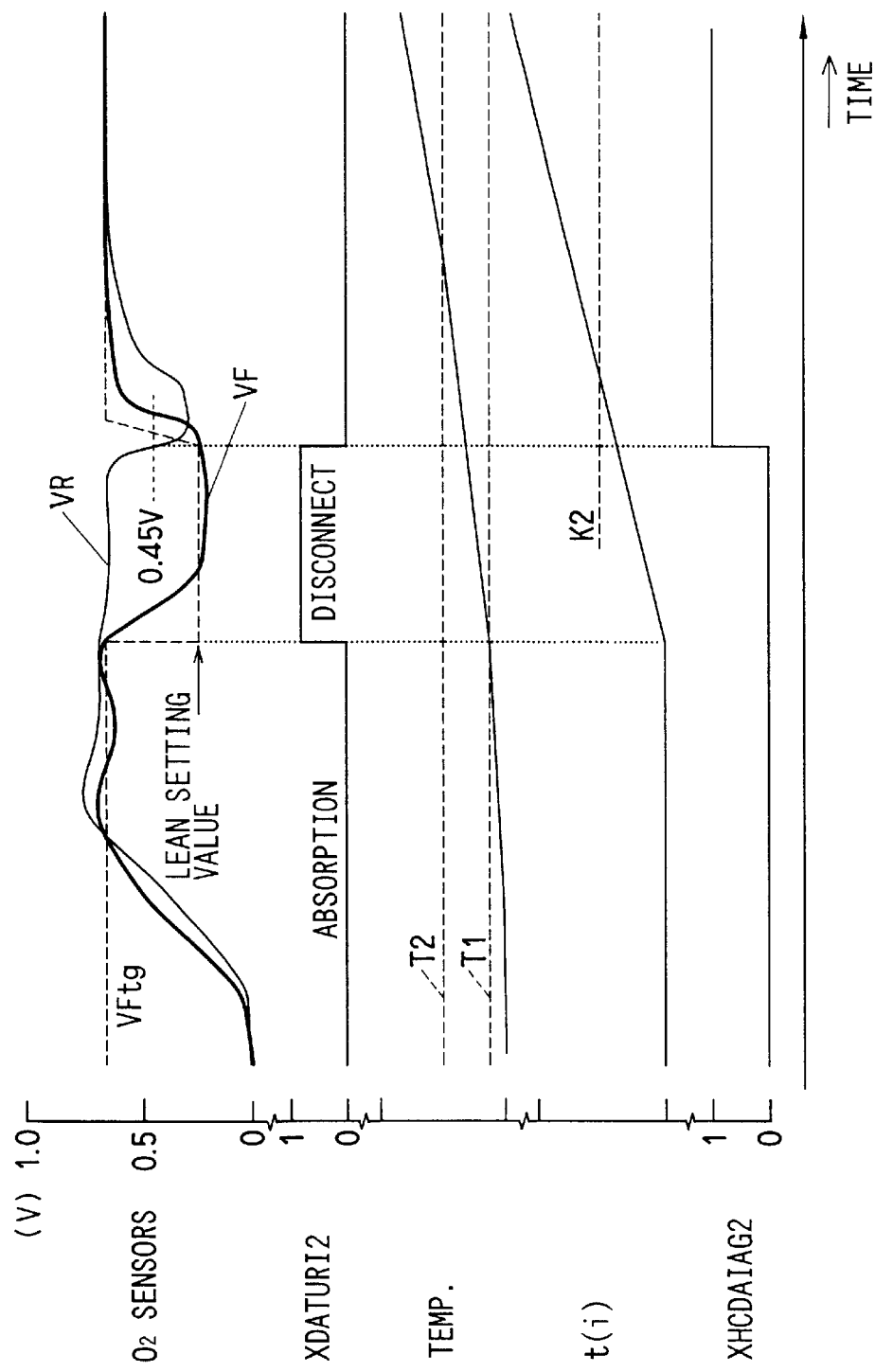
FIG. 10 is a diagram showing an example of a control when the HC catalyst is deteriorated according to the second embodiment of the present invention.

An elapsed time of the desorbing condition is counted as a period of lean setting t(i) by counting an interval $\Delta$t in a step 221. The period of lean setting t(i) is repeated until the output VR turns from the rich to the lean voltage in a step 222. In a step 223, the count t(i) is compared with a threshold K2. If the count t(i) is equal to or longer than the threshold K2, the flag XHCDAIAG2 is reset in a step 224. If the count t(i) is less than the threshold K2, the flag XHCDAIAG2 is set in a step 225. For example, if the HC catalyst 23 is deteriorated, the count t(i) is not able to reach the threshold K2 until the output VR turns into the lean value as shown in FIG. 10. If the deterioration of the HC catalyst 23 is detected, the ECU 29 activates a warning lamp and keeps information in a back-up RAM. This embodiment also works in the re-start situation described with reference to FIG. 7.

(Third Embodiment)

Although only the target value VFtg for the upstream side of the HC catalyst 23 is corrected to the leaner value in the above-described embodiment, the target values on both sides of the HC catalyst 23 are independently corrected to the leaner values in the third embodiment. According to the third embodiment, it is possible to maintain the A/F ratio in the HC catalyst 23 at the leaner value with certainty.

Figure 11:
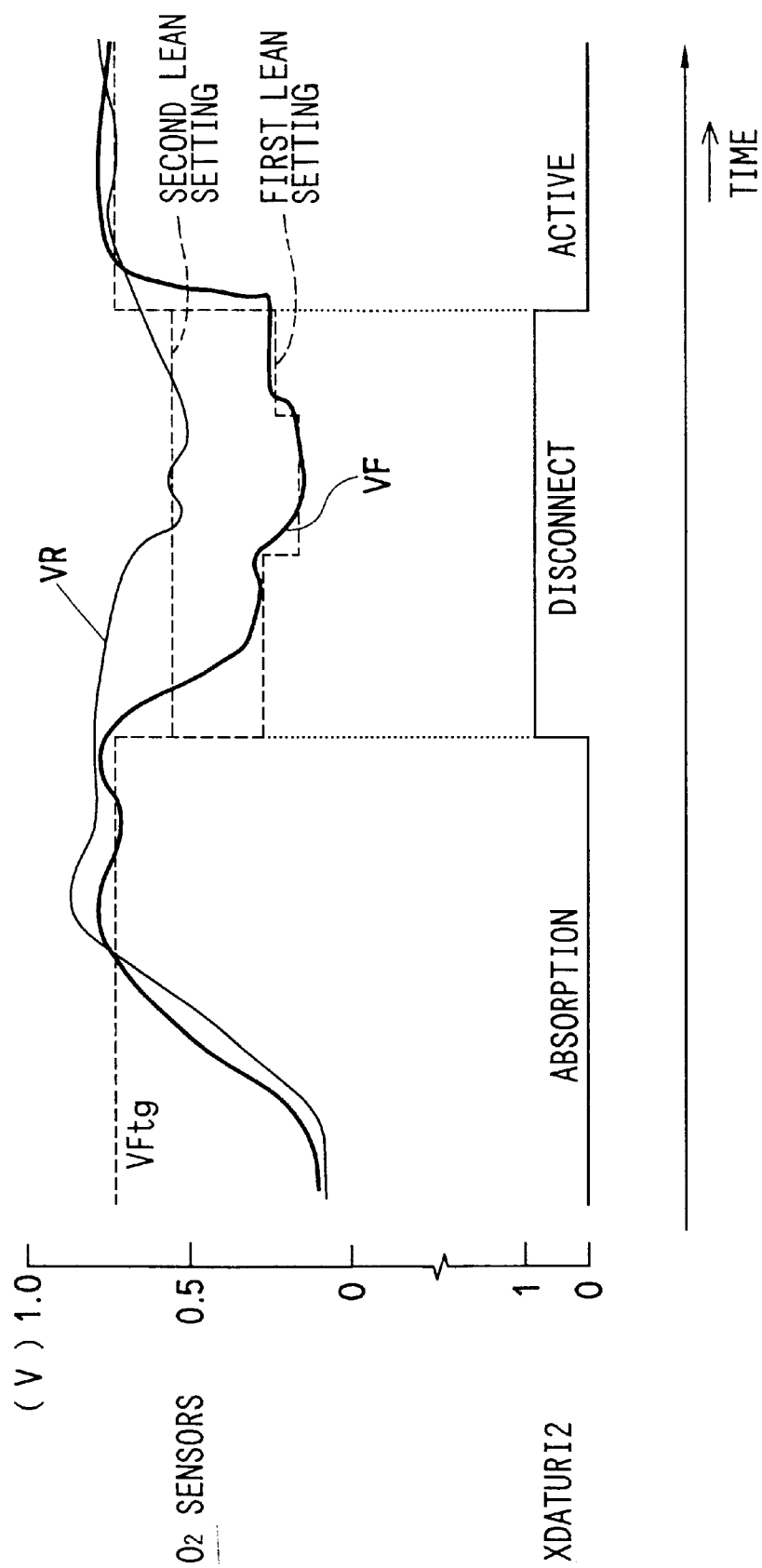
FIG. 11 is a diagram showing an example of a control when the HC catalyst is deteriorated according to a third embodiment of the present invention.

In the third embodiment, the step 105 in FIG. 2 is modified to provide independent target values VFtg and VRtg for the upstream and downstream sides of the HC catalyst respectively. In the step 105, the target value VRtg for the downstream side is provided as a leaner value than the normal setting characteristic. For example, VRtg may be a fixed value. The target value VFtg for the upstream side is provided as a leaner value based on one of the similar characteristics described in FIG. 4. Here, the target value VRtg is set richer than the target value VFtg in consideration with the desorbed HC from the HC catalyst 23. As a result, the outputs VF and VR follow the target values VFtg and VRtg as shown in FIG. 11. This embodiment also works in the re-start situation described with reference to FIG. 7.

(Fourth Embodiment)

Figure 12:
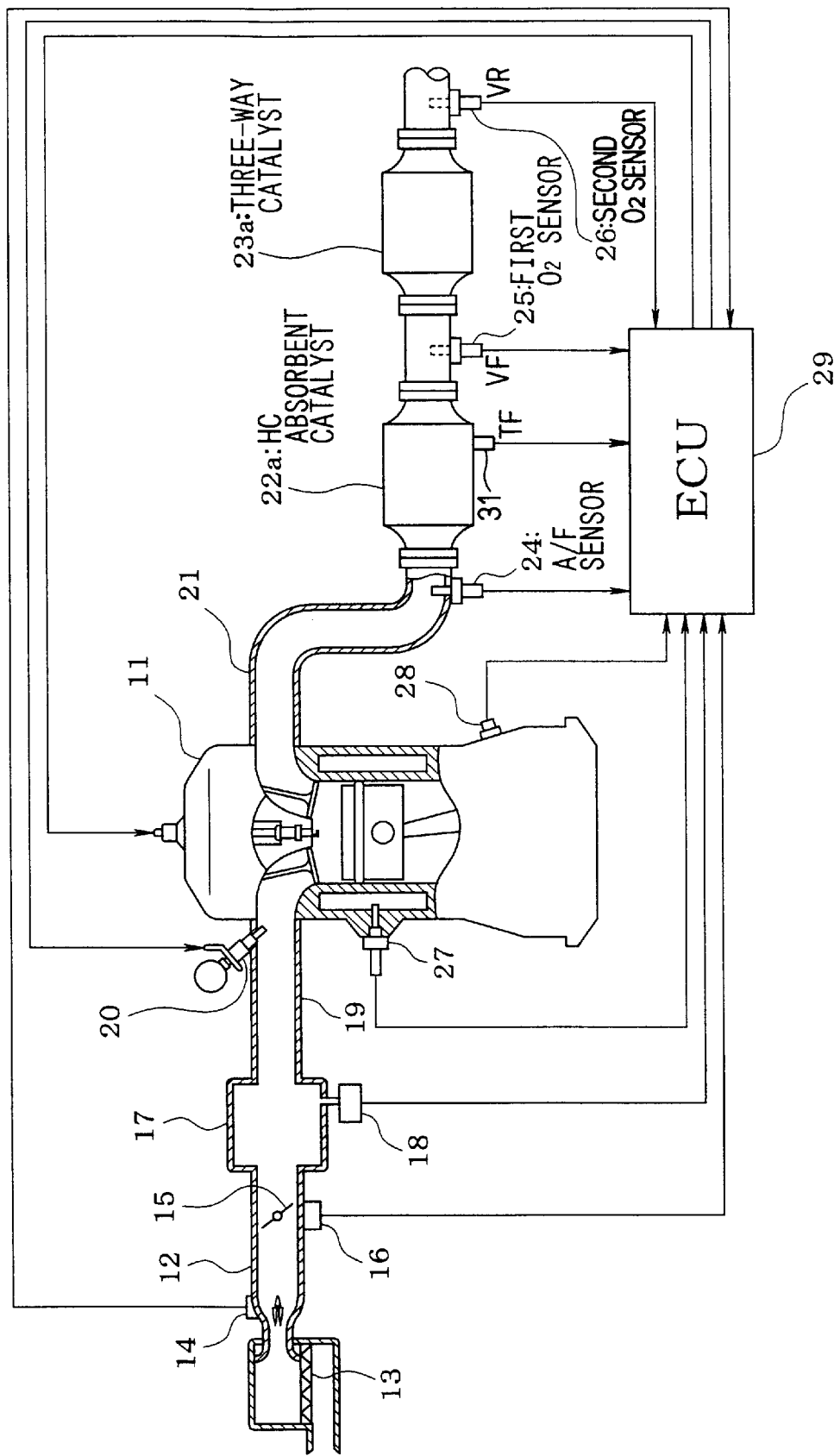
FIG. 12 is a schematic view of an engine control system including an emission control apparatus for an engine according to a fourth embodiment of the present invention.

Referring to FIG. 12, the HC catalyst 22a as a HC trapper is utilized for the first catalyst 22a, and the three-way catalyst 23a is utilized for the second catalyst 23a in the fourth embodiment. In the fourth embodiment, the HC catalyst 22a has a temperature sensor 31 for detecting a temperature TF of the HC catalyst 22a.

Figure 13:
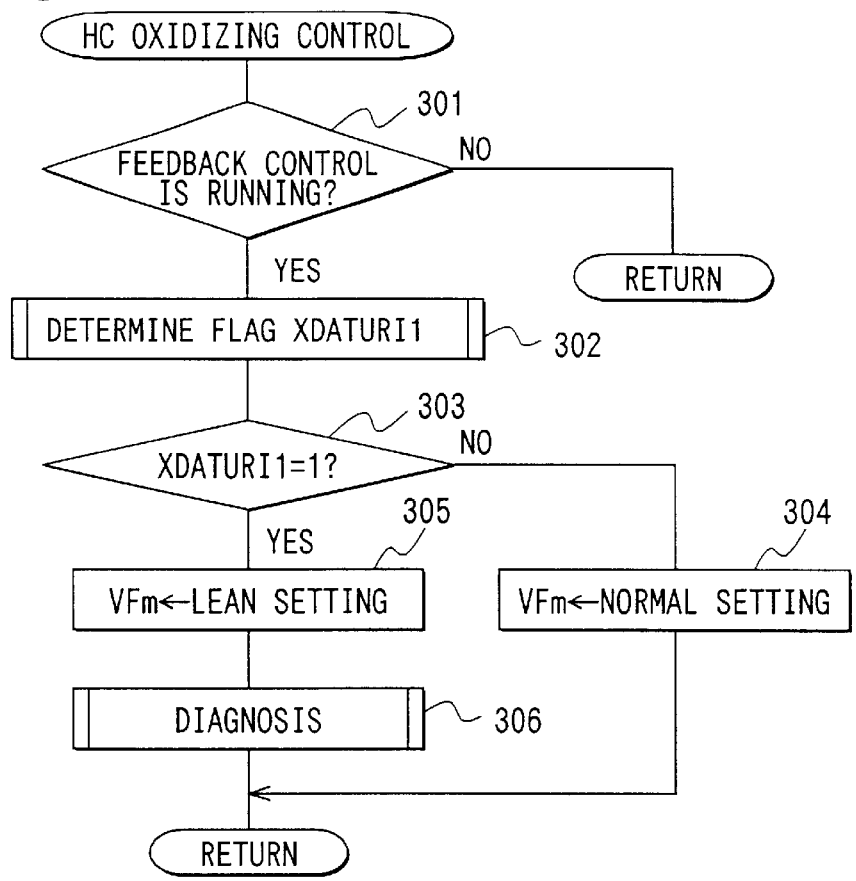
FIG. 13 is a flowchart showing an operation of the apparatus according to the fourth embodiment of the present invention.
Figure 14:
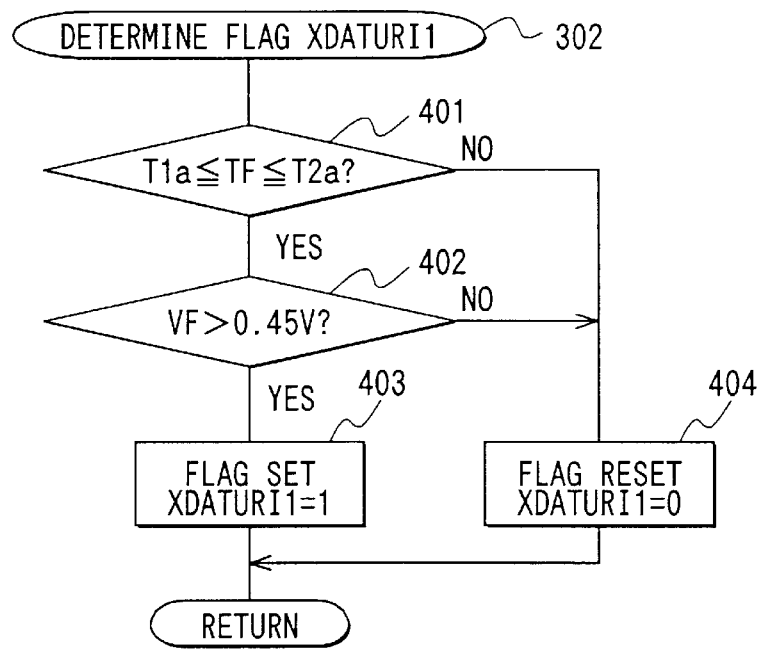
FIG. 14 is a flowchart showing an operation of the apparatus according to the fourth embodiment of the present invention.
Figure 15:
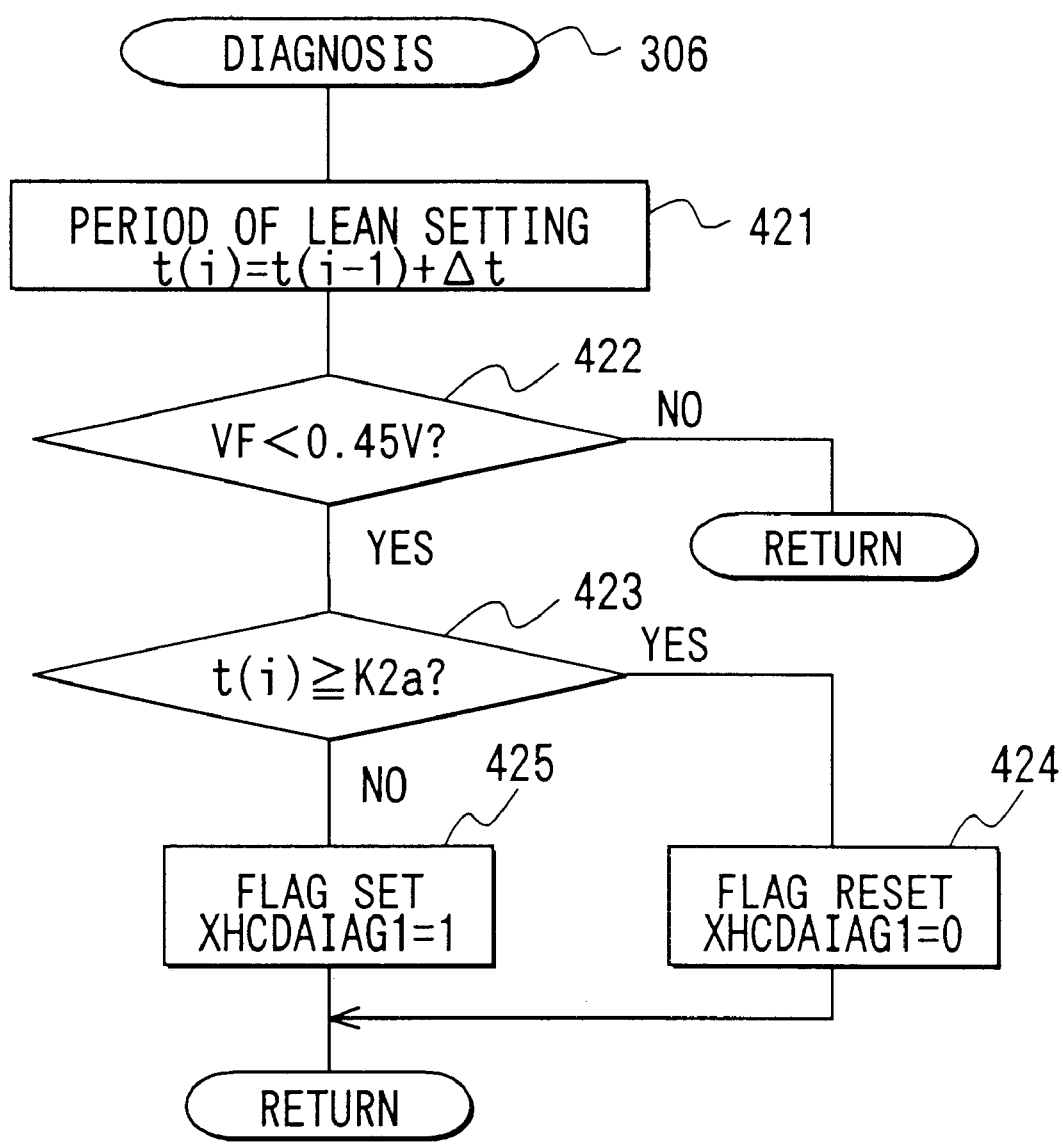
FIG. 15 is a flowchart showing an operation of the apparatus according to the fourth embodiment of the present invention.

The ECU 29 runs programs as shown in FIGS. 13, 14 and 15 corresponding to FIGS. 2, 3 and 9 respectively. Therefore, the ECU 29 functions similar to the second embodiment.

In a step 301, it is determined that at least one of the F/B controls is running or not. In a step 302, it is determined that the HC catalyst 22a is in the desorbing condition or not, and set or reset a flag XDATURI1.

Referring to FIG. 14, the flag XDATURI1 is set when the temperature TF is within a range between T1a and T2a, and when the output VF of the second sensor 25 indicates a rich atmosphere. Here, the reference temperature T1a may be 100° C., and T2 a may be 200° C.

If the flag XDATURI1 doesn't indicate the desorbing condition, the routine proceeds to a step 304 through a step 303. In the step 304, a target value VFm for the main F/B loop is provided based on the normal setting characteristic similar to the characteristic shown in FIG. 4. As a result, the main F/B loop maintains the A/F of the upstream side of the HC catalyst 22a at the normal target value.

On the other hand, if the flag XDATURI1 indicates the desorbing condition, the routine proceeds to steps 305 and 306 through the step 303. In the step 305, the target value VFm is provided based on the lean setting characteristic similar to the characteristic shown in FIG. 4. As a result, the main F/B loop maintains the A/F of the upstream side of the HC catalyst 22a at the leaner target value. Then, a diagnosis program is executed in the step 306.

Referring to FIG. 15, the ECU 29 counts a period of lean setting by steps 421 and 422. Then, if the count t(i) doesn't reach to a threshold value K2a when the output VF of the second sensor 25 turns into lean, the ECU 29 sets a flag XHCDAIAG1, turns on a warning lamp and keeps deterioration information in a backup RAM.

According to the fourth embodiment, only the target value for the main F/B loop is corrected to a lean side. Therefore, it is possible to supply a sufficient amount of oxygen to the HC catalyst 22a to purify the desorbed HC from the HC catalyst 22a itself by oxidizing the desorbed HC.

(Fifth Embodiment)

Figure 16:
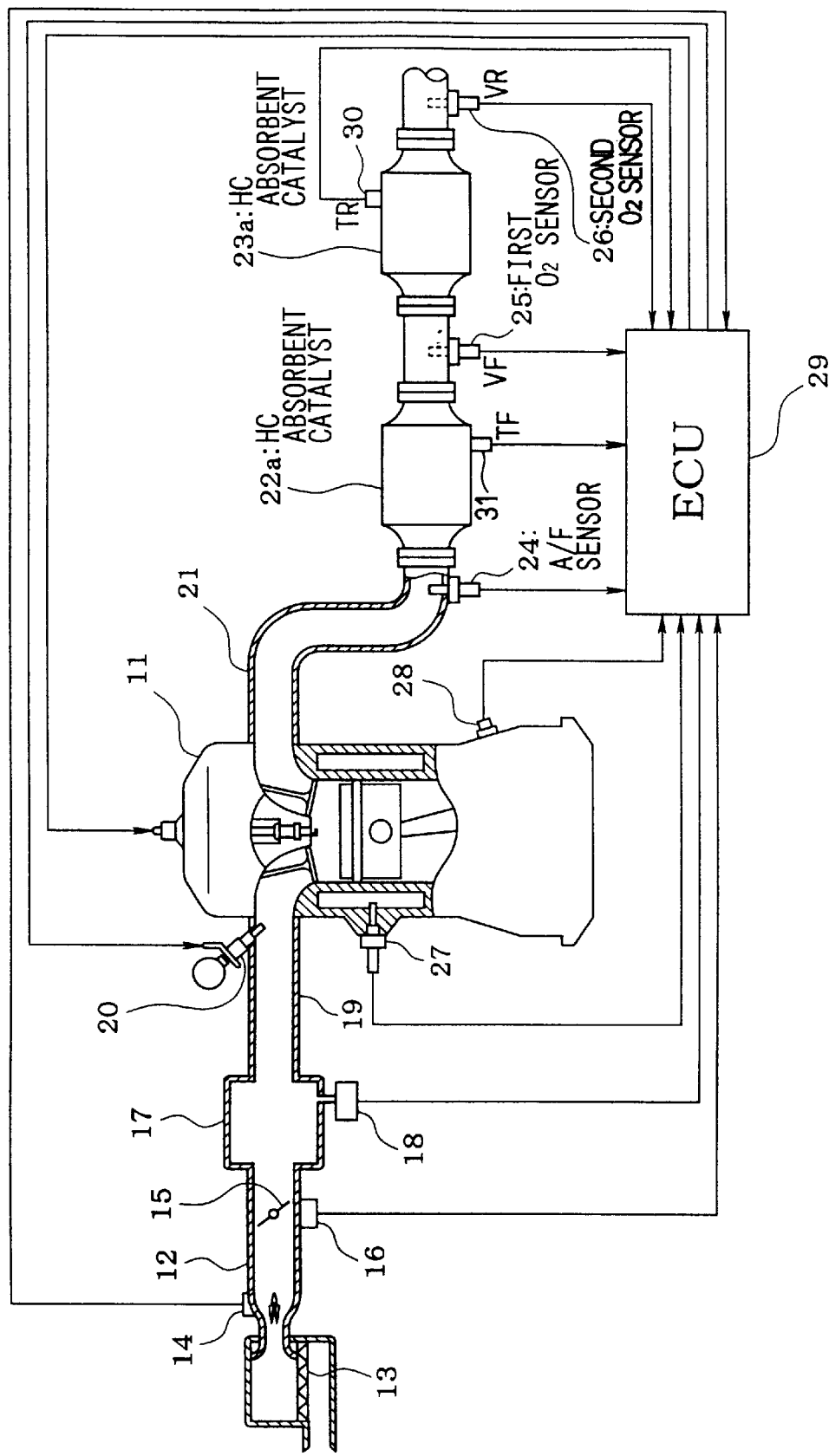
FIG. 16 is a schematic view of an engine control system including an emission control apparatus for an engine according to a fifth embodiment of the present invention.
Figure 17:
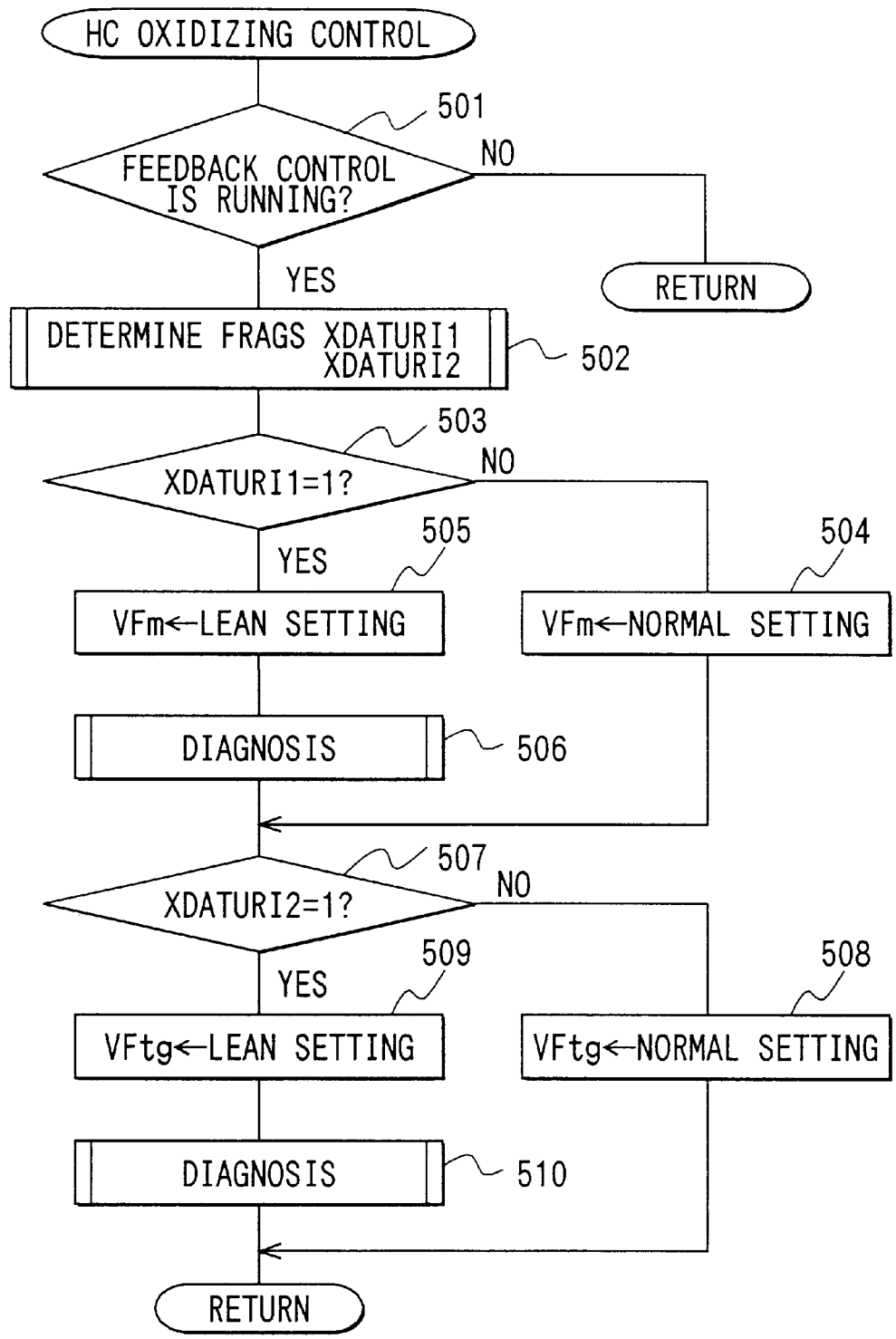
FIG. 17 is a flowchart showing an operation of the apparatus according to the fifth embodiment of the present invention.
Figure 18:
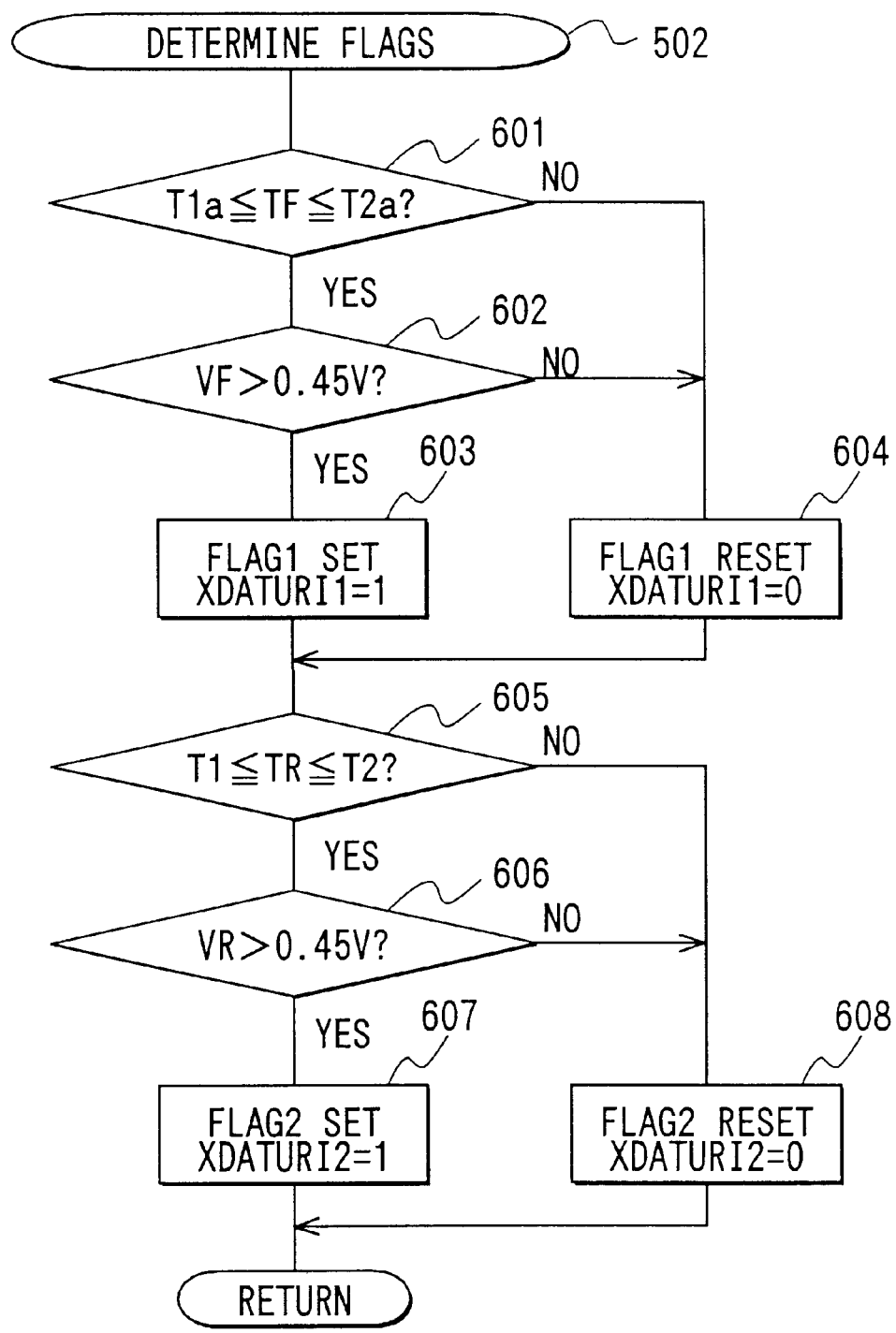
FIG. 18 is a flowchart showing an operation of the apparatus according to the fifth embodiment of the present invention.

Referring to FIG. 16, both of the first and second catalysts 22a and 23 are the HC catalysts as the HC trappers. In the fifth embodiment, the HC catalyst 22a has the temperature sensor 31, and the HC catalyst 22a has the temperature sensor 30. The ECU 29 runs programs as shown in FIGS. 17 and 18.

In a step 501, it is determined that at least one of the F/B controls is running or not. If any one of the F/B controls is running, the ECU 29 determines flags XDATURI1 and XDATURI2 by executing a step 502 as shown in FIG. 18. Referring to FIG. 18, steps 601–604 are the same as the steps 401–404 in FIG. 14, and steps 605–608 are the same as the steps 201–204 in FIG. 3. After that, the ECU 29 provides the target values VFm and VFtg and diagnoses the HC catalysts 22a and 23 by executing steps 503–510. Referring to FIG. 17, steps 503–506 are the same as the steps 303–306 in FIG. 13, and steps 507–510 are the same as the steps 103–106 in FIG. 2.

As a result, both of the target values VFm and VFtg are independently corrected to the lean side when the corresponding HC catalyst is in the desorbing condition. For instance, the target value VFm is corrected to the lean side when the HC catalyst 22a which is associated with the target value VFm by the main F/B loop is in the desorbing condition. Likewise, the target value VFtg is corrected to the lean side when the HC catalyst 23 which is associated with the target value VFtg by the first sub-F/B loop is in the desorbing condition.

Although the controller is provided by the ECU 29 in the above-described embodiments, the controller may be provided by a plurality of electric control units.

Although the above-described embodiments have two catalysts, three or more catalysts may be disposed in the exhaust passage. In the case that three or more HC catalysts are disposed in series in the exhaust passage, it is possible to divide them into two groups of catalysts and provide the similar F/B loops described in the previous embodiments. Further, it is possible to control each of the A/F ratios by providing three or more F/B loops.

Although the HC catalysts have both the HC absorbent and the three-way components in the above-described embodiment, the HC catalyst may only carry the HC absorbent. Further, the HC catalysts may have a series configuration of the substrates which carry the HC absorbent and the three-way catalyst component respectively.

Although the present invention has been described in connection with the preferred embodiments thereof with reference to the accompanying drawings, it is to be noted that various changes and modifications will be apparent to those skilled in the art. Such changes and modifications are to be understood as being included within the scope of the present invention as defined in the appended claims.

What is claimed is:

1. An emission control apparatus for an engine comprising:
   at least two series disposed catalysts in an exhaust passage including a first catalyst and a second catalyst, at least one of the catalysts being a HC absorbent catalyst which includes a HC absorbent for absorbing HC in an exhaust gas in an absorbing condition and desorbing an absorbed HC in a desorbing condition;
   a first sensor which detects an air-fuel ratio or rich/lean of the exhaust gas at an upstream side of the first catalyst;
   a second sensor which detects an air-fuel ratio or rich/lean of the exhaust gas at an upstream side of the second catalyst;
   a third sensor which detects an air-fuel ratio or rich/lean of the exhaust gas at a downstream side of the second catalyst; and
   a controller which provides a main feedback loop which varies a fuel amount supplied to the engine so that the air-fuel ratio detected by the first sensor is maintained at a first target value, a first sub-feedback loop which varies the first target value so that the air-fuel ratio detected by the second sensor is maintained at a second target value, and a second sub-feedback loop which varies the second target value based on the air-fuel ratio detected by the third sensor, wherein the controller further comprises a setting device which provides at least one of the target values associated with the HC absorbent catalyst by one of the feedback loops, and the setting device sets the target value to a leaner value when the corresponding HC absorbent catalyst is in the desorbing condition.

2. The emission control apparatus for an engine according to claim 1, wherein the controller further comprises a detecting device which detects a deterioration of the HC absorbent catalyst based on an output from the sensor disposed on a downstream side of the HC absorbent catalyst.

3. The emission control apparatus for an engine according to claim 1, further comprising a temperature sensor for detecting a temperature of the HC absorbent catalyst or the exhaust gas, wherein the setting device determines whether the HC absorbent catalyst is in the desorbing condition based on the temperature detected by the temperature sensor.

4. The emission control apparatus for an engine according to claim 1, wherein the setting device determines whether the HC absorbent catalyst is in the desorbing condition based on an elapsed time from starting the engine.

5. The emission control apparatus for an engine according to claim 1, wherein the setting device puts the target value back when the HC absorbent catalyst reaches to an activated condition or when the output of the sensor disposed downstream of the HC absorbent catalyst is changed from rich to lean.

6. The emission control apparatus for an engine according to claim 1, wherein one of the first and second sub-feedback loops controlling a downstream side air-fuel ratio of the HC absorbent catalyst maintains the downstream side air-fuel ratio of the HC absorbent catalyst at a leaner value when the HC absorbent catalyst is in the desorbing condition, the leaner value being leaner than a value when the HC absorbent catalyst is in the absorbing condition.

7. The emission control apparatus for an engine according to claim 1, wherein the first catalyst is the HC absorbent catalyst, and the setting device sets the first target value into the leaner value.

8. The emission control apparatus for an engine according to claim 7, wherein the controller further comprises a detecting device which detects a deterioration of the HC absorbent catalyst based on the output of the sensor disposed on a downstream side of the HC absorbent catalyst.

9. The emission control apparatus for an engine according to claim 1, wherein the first and second catalysts are the HC absorbent catalysts, the setting device sets the first target value into the leaner value when the first catalyst is in the desorbing condition, the leaner value being leaner than a value when the first catalyst is in the absorbing condition, and the setting device sets the second target value into the leaner value when the second catalyst is in the desorbing condition, the leaner value being leaner than the target value when the second catalyst is in the absorbing condition.

10. The emission control apparatus for an engine according to claim 1, wherein the leaner value of the target value is determined to maintain emissions of nitrogen oxides.

11. The emission control apparatus for an engine according to claim 1, wherein the second catalyst is the HC absorbent catalyst, and the setting device sets the second target value into the leaner value.

12. The emission control apparatus for an engine according to claim 11, wherein the controller further comprises a detecting device which detects a deterioration of the second catalyst based on the output of the third sensor.

13. The emission control apparatus for an engine according to claim 11, wherein the setting device puts the target value back when the second catalyst reaches an activated condition or when the output of the third sensor is changed from rich to lean.

14. The emission control apparatus for an engine according to claim 11, wherein the second sub-feedback loop varies the second target value so that the air-fuel ratio detected by the third sensor is maintained at a third target value, and wherein the setting device further sets the third target value into a leaner value when the HC absorbent catalyst is in the desorbing condition.

15. The emission control apparatus for an engine according to claim 1, wherein the setting device sets the target value into the leaner value to increase catalysis of a desorbed HC.

16. The emission control apparatus for an engine according to claim 1, wherein the setting device provides the target value based on a normal setting characteristic when the HC absorbent catalyst is in the absorbing condition, and provides the target value based on a lean setting characteristic which tends to provide leaner values than the normal setting characteristic when the HC absorbent catalyst is in the desorbing condition.

17. The emission control apparatus for an engine according to claim 1, wherein the setting device sets the leaner value during the HC absorbent catalyst is in the desorbing condition.

18. A method for reducing emissions of an engine including at least two series disposed catalysts in an exhaust passage including a first catalyst and a second catalyst, at least one of the catalysts being a HC absorbent catalyst which includes a HC absorbent for absorbing HC in an exhaust gas when the catalyst is in an absorbing condition and desorbing an absorbed HC when the catalyst is in a desorbing condition, the method comprising:
   providing a normal target value as a target air-fuel ratio;
   maintaining an upstream side air-fuel ratio of the HC absorbent catalyst at the normal target value when the HC absorbent catalyst is in the absorbing condition;

providing a leaner target value as the target air-fuel ratio which is leaner than the normal target value; and maintaining the upstream side air-fuel ratio of the HC absorbent catalyst at the leaner target value when the HC absorbent catalyst is in the desorbing condition;

wherein the upstream side air-fuel ratio of the HC absorbent catalyst is provided by exhaust gas just upstream the HC absorbent catalyst.

19. The method for reducing emissions of an engine according to claim 18, further comprising:

maintaining an upstream side air-fuel ratio of the HC absorbent catalyst at the normal target value when the HC absorbent catalyst is in the activated condition.

20. The method for reducing emissions of an engine according to claim 18, further comprising:

detecting a deterioration of the HC absorbent catalyst based on an air-fuel ratio in a downstream side of the HC absorbent catalyst when the target value is maintained at the leaner target value.

21. The method for reducing emissions of an engine according to claim 18, wherein maintaining the upstream side air-fuel ratio of the HC absorbent catalyst at the leaner target value includes:

detecting an air-fuel ratio on the basis of content of exhaust gas just upstream the HC absorbent catalyst; and controlling the detected air-fuel ratio to the leaner target value in a feedback control manner.

22. The method for reducing emissions of an engine according to claim 18, wherein the leaner target value is provided in accordance with an output of a sensor that is disposed downstream the HC catalyst and detects contents of the exhaust gas just downstream the HC catalyst.

* * * * *